May 24, 1960
C. W. STEWART
2,937,658
VENTING MEANS FOR REGULATORS
Filed Feb. 13, 1956
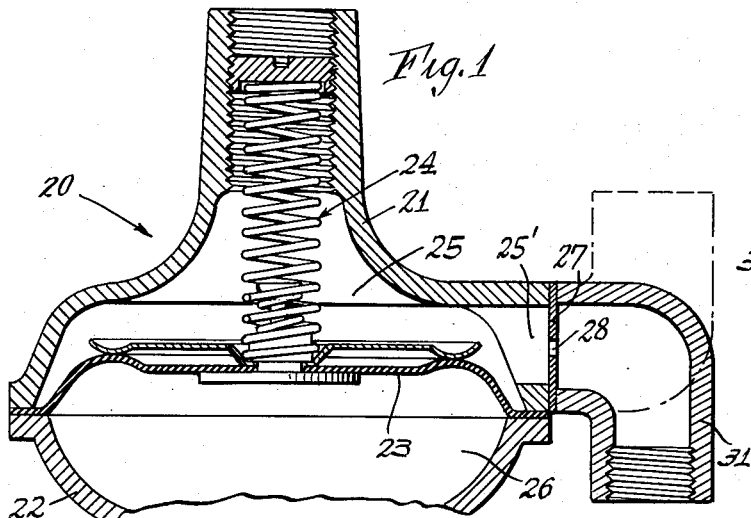
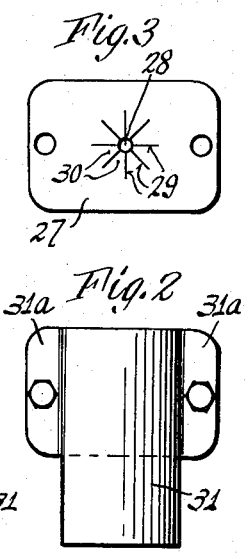
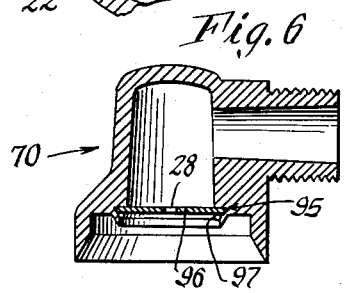
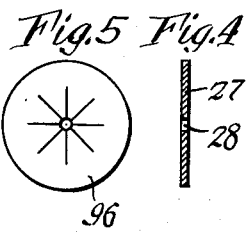
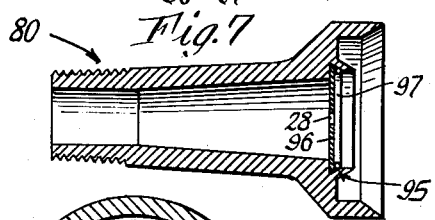
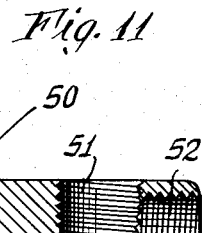
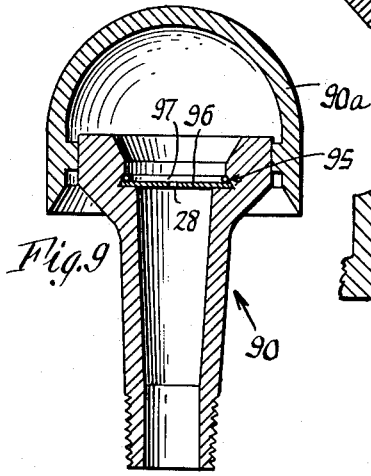
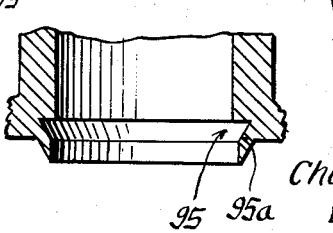
INVENTOR.
Charles W. Stewart
BY
Johnson and Kline
ATTORNEYS United States Patent Office 2,937,658
Patented May 24, 1960

2,937,658

VENTING MEANS FOR REGULATORS

Charles W. Stewart, Fairfield, Conn., assignor to The Sprague Meter Company, Bridgeport, Conn., a corporation of Connecticut Filed Feb. 13, 1956, Ser. No. 565,099

7 Claims. (Cl. 137—505)

This invention relates to pressure regulating devices and more specifically to an improved venting means for suppressing vibrations inherent in an operating pressure regulating device.

One of the most serious and complex problems in the fluid pressure regulating art is the phenomenon of pulsation. To date, the experts in the field have not been able to concisely determine the true cause nor the cure designwise for this inherent characteristic in all fluid pressure regulating devices. In the opinion of these experts, the phenomenon is considered to be the result of harmonics developed through a combination of influencing factors, such as inlet and delivery pressures, orifice size, lever ratios, diaphragm areas, spring and/or dead weight diaphragm loading, gas velocities, specific gravity of the gas and diaphragm breather vent areas. While the exact cause of these harmonic vibrations remains a mystery, the effects thereof are quite obvious.

The destructive force of this vibrating condition is quite serious and can cause serious wear and damage not only to the pressure regulator mechanism, but also to adjacent piping and meter equipment in the system. In efforts to dampen such vibrations, the practice is to restrict the breather venting areas.

Heretofore, one way in which this was accomplished was to restrict the breather venting area by providing a small permanent hole in the breather vent. While this small hole was effective in reducing the pulsating phenomenon, it had the disadvantage of low capacity venting. Thus, if the pressure regulator diaphragm ruptured or the internal over pressure relief valve operated due to a defective regulator pressure control, the small permanent hole was incapable of rapidly venting the excessive pressure built up therein. In such an event, the danger of the device to blow was ever present.

Another construction which was heretofore often resorted to in an effort to reduce the damage of blowing due to excessive build up of pressure was to provide the breather vent with a relatively large permanent hole which was restricted by a poppet or disc valve. Thus, the poppet valve enabled the vent to open to a maximum capacity under the maximum pressure conditions so that the chamber would be sufficiently and rapidly vented, thereby eliminating the danger of "blowing" the device. However, the disadvantage in the use of the poppet or disc valve for restricting the breather opening was that the poppet was gravity actuated and could only be vertically mounted. As a result, those devices utilizing the poppet construction were ineffective for venting regulator devices which required the breather vent to be positioned off the vertical when so required by a particular installation.

An object of the present invention is to provide an improved, simple and economical venting means which is provided with a small, permanent hole for low capacity venting, yet capable of maximum capacity venting in the event the regulator diaphragm ruptured or the over pressure relief valve actuated so that the danger of blowing is prevented.

Another object of this invention is to provide a venting means which includes a vent opening which is capable of expanding in proportion to the demands of the regulating device.

According to this invention, the above objects are accomplished by providing the vent chamber of a regulating device with a flexible membrane having a small permanent opening and radially extending slits extending outwardly therefrom. The chamber is normally vented through the aperture of the membrane, however, because of the radial slits and flexibility of the membrane, the aperture is capable of expanding or constricting in proportion to the demands of the regulating device. As a result, the advantages of both the small permanent vent opening and poppet maximum venting structure heretofore used are combined without carrying along the inherent disadvantages inherent in either of the prior structures.

A feature of this invention resides in the provision of a flexible membrane having a small permanent opening which is adapted to expand according to the pressures acting thereon so that the harmonic pulsations are controlled and the venting chamber of a pressure regulating device can be safely vented under all conditions.

Another feature of this invention resides in the provision of venting a regulating device through a flexible membrane having a very small permanent opening in which the advantages and features of both the small permanent opening venting method are combined with the advantages of an enlarged, maximum capacity, poppet venting construction.

Still another feature of the invention resides in the provision that the flexible membrane is sufficient to protect the pressure regulating device from insects and other foreign matters from entering therein, thus eliminating the need for bug screens or the like.

Another feature of this invention resides in the provision that the improved venting means is simple to manufacture, inexpensive to produce and positive in operation.

Another feature of this invention resides in the provision that the flexible membrane forming the venting means can be disposed, relative to the venting area, either horizontally, vertically or at any angle in between without effecting the operation thereof; thus, rendering the improved venting structure adaptable to any installation requirement.

Other features and advantages will be apparent from the specification and claims when considered in connection with the drawings in which:

Figure 1 is a fragmentary sectional view of a pressure regulating device illustrating the improved venting means connected thereto; alternate structure shown by broken lines.

Fig. 2 is a right end view of Fig. 1.

Fig. 3 is a detail front view of the improved flexible membrane through which the vent chamber is vented.

Fig. 4 is a detail side view of the flexible diaphragm member illustrating the minimum and normal opening of the apertured membrane.

Fig. 4a illustrates a side view of the membrane for maximum venting as in the case of a ruptured diaphragm.

Fig. 5 is a modified form of the flexible membrane.

Fig. 6 is a detail sectional view of a venting cap or conduit which is adapted to be connected to the pressure regulating device.

Fig. 7 is a modified form of the venting cap.

Fig. 8 is a detail view illustrating the retaining seat for securing the membrane within the venting cap.

Fig. 9 is a detail sectional view of a venting cap or conduit having a cover therefor.

Fig. 10 is a detail view of the flexible membrane retaining ring member.

Fig. 11 is a detail fragmentary view of a modified form venting chamber cover of a pressure regulating device.

Referring to the drawings, Fig. 1 illustrates a pressure regulating device in the form of a gas pressure regulator 20 comprising essentially of a casing consisting of a cover dome 21 and a bottom casting 22. Disposed between the dome and bottom is a regulator diaphragm 23 having the usual diaphragm spring-loading means 24 extending upwardly in the dome; the diaphragm 23 dividing the casing into a venting chamber 25 and a pressure chamber 26.

Since pressure regulating devices are affected by the phenomenon pulsation, it has been customary to provide the vent chamber with a breathing vent area having a permanent opening or aperture. However, while such vent openings were discovered to control the inherent vibrations of the regulative device, e.g. a gas pressure regulator, the means heretofore utilized for venting the regulator were not suitable under all operating conditions. That is, the small aperture or low capacity venting means was not suitable for safely venting the regulator in the event of a ruptured diaphragm. The maximum capacity type venting means utilizing the poppet valve was limited only to regulators having vertically-disposed venting areas because the poppets were gravity actuated.

According to this invention, an improved venting means is provided in which the advantages of both the low and maximum capacity venting constructions are combined by the utilization of a relatively simple structure without the retentions of the disadvantages of either of the prior known manner of venting. This is accomplished by closing the breather vent area 25' of the regulator with a flexible membrane 27 made of rubber, neoprene or other like substance and providing the membrane with a small permanent aperture 28 located centrally thereof. Extending radially outwardly from the small aperture 28 there is provided a plurality of radial slits 29 to form segmented portions 30 capable of flexing in accordance to the amount of pressure acting thereon, thus enlarging the vent opening to accommodate for the varying pressure changes which may occur. Thus, in normal operation of the regulator the venting is through the small aperture 28, see Fig. 4. In the event of a rupture of the regulator diaphragm or the like, the increased pressure enlarges the aperture or opening as illustrated in Fig. 4a. As a result, maximum venting is possible thereby insuring against any blowing of the regulator although the vent means is provided only with a small permanent opening.

As shown in Fig. 1, a venting conduit 31 is provided, if desired, so that the venting or exhausting may be directed in any direction. The illustrated conduit 31 of Fig. 1 comprises a 90° elbow having a flange 31a adjacent one end thereof so that the membrane 27 is secured between the flange 31a and cooperating portion of the dome cover, whereby the membrane forms a flexible wall portion of the venting chamber.

Because of the uncertainty in the manner in which some regulators are to be mounted, it may be desirable to provide the regulator with a modified form of a venting cover 50 as illustrated in Fig. 11. As shown, this cover 50 is provided with a pair of angularly-disposed taps 51 and 52 adaptable for receiving a novel venting cap as will be herein described.

Referring to Fig. 11, it will be noted that the vertical tap 51 is preferably threaded and is adapted to extend through the cover and into the chamber portion 53. The other tap 52 is preferably horizontally disposed and is adapted to communicate with the intermediate portion of the vertical tap 51, and is in communication with the vent chamber through tap 51.

Adapted to be fitted into either of the taps 51 or 52 is a vent cap, several modifications of which are illustrated in Figs. 6, 7 and 9.

Fig. 6 illustrates a vent cap 70 in which the open ends thereof are angularly disposed. In Fig. 7, the conduit 80 has the open ends axially opposed. The conduit 90 of Fig. 9 is similar to that of Fig. 6, but illustrated with a cap cover 90a for protecting the membrane.

As illustrated, the conduits 70, 80 and 90 are provided with a threaded portion adjacent one end thereof which is adapted to be threadedly engaged in either of the taps 51 or 52 as required by the particular installations, the tap not in use being plugged by any suitable means.

Adjacent the other end of the conduit, there is provided an annular, undercut groove 95 which forms a seat in which the membrane 96 is retained. It will be noted that the membrane extends transversely between the walls of the conduit and is retained in the groove 95 by a spring wire, retaining ring 97 which is snapped in the groove, the undercut portions 95a frictionally retaining the spring 97 and prevents the latter from becoming free therefrom. Thus, it will be noted that the membrane 96 is simply, releasably secured in place within the conduit. With the exception of its shape, the membrane 96 is similarly constructed as described hereinbefore.

By proper selection of the vent cap and cooperating tap opening in the dome cover 50, any of several different installations can be made. It will be further noted that the particular relationship of the membrane 96 relative to any particular reference line is unimportant. The operation of the membrane venting means 27 or 96 according to this invention remains unaffected by the manner of installation. Consequently, this feature is a major improvement over the poppet type of venting means heretofore utilized which had to be vertically disposed. Furthermore, the variable venting opening of the instant improved venting means affords a safety factor not present in the permanent small aperture venting means commonly employed heretofore.

Another serious problem which the improved venting means of the present invention overcomes is that of the mud-dauber or other insects from clogging or otherwise building a nest, cocoon or the like in the opening of the vent. Because the membrane of the instant case if formed of neoprene, rubber or the like, the slick surface and flexibility of the same discourages the mud-dauber from nesting thereon. As a result, a bug screen is unnecessary and a heretofore serious problem is remedied.

Variations and modifications may be made within the scope of the claims and portions of the improvements may be used without others.

I claim:

1. A pressure regulating device comprising a casing having a diaphragm partitioning the same into a venting chamber and a pressure chamber, a venting means for venting said venting chamber to the atmosphere, said venting means including a nonmetallic flat flexible membrane forming a flexible wall portion of said venting chamber, said membrane being operable in either direction in response to fluctuations of said diaphragm and being formed with an aperture and having a plurality of slits extending radially outwardly therefrom to form a variable opening therein capable of constricting or expanding proportionately to the demands of the regulating device to control the amount of venting whereby the phenomenon of harmonic vibrations inherent in an operating pressure regulating device is materially reduced thereby.

2. A pressure regulating device comprising a casing having a diaphragm partitioning the same into a venting chamber and a pressure chamber, said casing being provided with a pair of angularly disposed openings communicating with said vent chamber, a venting means operable in either direction in response to fluctuations of said diaphragm for venting said venting chamber to the atmosphere, said venting means including an open end conduit means forming part of said conduit adapted to be connected to one of said casing openings whereby said conduit is in open communication with said venting chamber to exhaust the same to the atmosphere, a flat flexible, nonmetallic membrane transversely disposed in said conduit, said membrane being formed with an aperture and having a plurality of slits extending radially outwardly therefrom to form a variable opening therein to control the amount of venting, said opening being capable of constricting or expanding in either direction proportionately to the demands of the regulating device whereby the phenomenon of harmonic vibrations inherent in an operating pressure regulating device is materially reduced thereby.

3. A pressure regulating device comprising a casing having a diaphragm partitioning the same into a venting chamber and a pressure chamber, a venting means operable in either direction in response to fluctuations of said diaphragm for venting said venting chamber to the atmosphere, said venting means including a conduit means connected to said casing, said conduit being in open communication with said venting chamber to exhaust the same to the atmosphere, a flexible, flat, nonmetallic membrane transversely fixedly disposed in said conduit, said membrane having an aperture having a plurality of slits extending radially outwardly from said aperture to form a variable opening to control the amount of venting, said opening being capable of constricting or expanding in either direction proportionately to the demands of the regulating device whereby the phenomenon of harmonic vibrations inherent in an operating pressure regulating device is materially reduced thereby.

4. A fluid pressure regulating device having a chamber provided with a vent opening and a control therefor, the improvement wherein said vent opening is formed as a large opening and said control comprises a fixed, flat, flexible membrane overlying the vent opening and having a small aperture in the center thereof and slits radiating therefrom, the slit portion of the membrane being movable in either direction to form a variable vent opening in proportion to the venting pressure of the regulating device whereby the harmonic vibrations inherent in said pressure regulating devices are substantially suppressed.

5. A fluid pressure regulating device having a vent chamber provided with a vent opening and a control therefor, the improvement wherein said vent opening is formed as a large opening and said control comprises a fixed, flat, flexible nonmetallic membrane overlying the vent opening and having the edges thereof secured in position, said membrane having a small aperture in the center thereof and slits radiating therefrom, the slit portion of the membrane being movable in either direction to form a variable vent opening in proportion to the pressure in the vent chamber of the regulating device whereby the harmonic vibrations inherent in said pressure regulating devices are substantially suppressed.

6. The invention as defined in claim 3 wherein said conduit has the open ends thereof axially aligned.

7. The invention as defined in claim 3 wherein said open ends of said conduit are angularly disposed.

References Cited in the file of this patent

UNITED STATES PATENTS

| | | |
|---|---|---|
| 2,302,284 | Abbott | Nov. 17, 1942 |
| 2,376,712 | Moran | May 22, 1945 |
| 2,593,315 | Kraft | Apr. 15, 1952 |
| 2,634,088 | Niesemann | Apr. 7, 1953 |
| 2,813,543 | Todd | Nov. 19, 1957 |